(12) United States Patent
Kohmura

(10) Patent No.: US 8,555,737 B2
(45) Date of Patent: Oct. 15, 2013

(54) CYLINDER DEVICE

(76) Inventor: Atsuo Kohmura, Hikari (JP)

( * ) Notice: Subject to any disclaimer, the term of this patent is extended or adjusted under 35 U.S.C. 154(b) by 455 days.

(21) Appl. No.: 12/736,330

(22) PCT Filed: Apr. 7, 2009

(86) PCT No.: PCT/JP2009/001613
§ 371 (c)(1),
(2), (4) Date: Sep. 28, 2010

(87) PCT Pub. No.: WO2009/125585
PCT Pub. Date: Oct. 15, 2009

(65) Prior Publication Data
US 2011/0016999 A1  Jan. 27, 2011

(30) Foreign Application Priority Data

Apr. 9, 2008 (JP) ................................. 2008-100952
Aug. 13, 2008 (JP) ................................. 2008-208463

(51) Int. Cl.
*F16H 3/06* (2006.01)
*F16H 27/02* (2006.01)
*F16H 29/02* (2006.01)
*F16H 29/20* (2006.01)

(52) U.S. Cl.
USPC ............................ 74/89.3; 74/89.27; 74/89.28

(58) Field of Classification Search
USPC ............... 74/89.23, 89.27, 89.28, 89.29, 89.3
See application file for complete search history.

(56) References Cited

U.S. PATENT DOCUMENTS

| 3,530,734 | A | * | 9/1970 | Wray et al. ................... 74/89.3 |
| 3,829,726 | A |   | 8/1974 | Nilsson |
| 5,111,708 | A | * | 5/1992 | Brusasco ..................... 74/89.23 |
| 5,130,585 | A | * | 7/1992 | Iwamatsu et al. ............... 310/59 |
| 5,704,250 | A | * | 1/1998 | Black ............................ 74/89.3 |
| 6,453,761 | B1 | * | 9/2002 | Babinski ..................... 74/89.34 |
| 7,963,529 | B2 | * | 6/2011 | Oteman et al. ............ 280/5.515 |

FOREIGN PATENT DOCUMENTS

| JP | 62-258258 | 11/1987 |
| JP | 63-180764 | 7/1988 |
| JP | 10-281056 | 10/1998 |
| JP | 2005-086932 | 3/2005 |

* cited by examiner

*Primary Examiner* — Justin Krause
(74) *Attorney, Agent, or Firm* — Muramatsu & Associates

(57) ABSTRACT

A cylinder device is capable of heightening the feed accuracy of a screw shaft and stably controlling the feed speed of a conveying unit in a wide speed range. A ball screw shaft is inserted through a hollow shaft motor having an end fixed to a housing, and a decelerator that is a planetary reduction gear unit connected to the hollow shaft motor. Each of a pair of ball screw nuts, which are disposed to face each other and between which the hollow shaft motor and the decelerator are placed, meshes with the ball screw shaft. An internal gear is connected to a spacer disposed at an end of an output gear of the decelerator. An external gear connected to the ball screw nut meshes with the internal gear. The output gear of the decelerator meshes with a connection shaft by splines.

4 Claims, 7 Drawing Sheets

CYLINDER DEVICE

This application is a U.S. national stage entry of International Patent Application No. PCT/JP2009/001613, filed Apr. 7, 2009, which claims the benefit of foreign filing priority based on Japanese Patent Application No. 2008-100952, filed Apr. 9, 2008 and Japanese Patent Application No. 2008-208463, filed Aug. 13, 2008, the entire contents of which are incorporated herein by reference.

TECHNICAL FIELD

This invention relates to a cylinder device that linearly moves a screw shaft while rotating a nut (hereinafter, referred to as a "screw nut") by use of an electric motor, and, more particularly, to a cylinder device that is capable of improving the feed accuracy of a screw shaft by reducing the runout of the screw shaft at the center of rotation of the screw shaft and that is capable of stably controlling the feed speed of the screw shaft while suppressing fluctuations in the output of a motor caused by switching between the numbers of rotations.

BACKGROUND ART

The cylinder device converts relative rotational motion between a screw shaft and a screw nut to linear motion, and hence linearly drives mechanism parts, or the like, that are connected to the screw shaft or to the screw nut. According to the type of a motor that rotationally drives the screw shaft and the screw nut, the cylinder device is classified into an electric, a hydraulic, and a pneumatic cylinder device. In particular, the electric cylinder device causes noise less frequently and can be more easily handled without causing oil leakage or the like than the hydraulic and pneumatic cylinder devices, and therefore the electric cylinder device is widely used in various pieces of industrial equipment. Therefore, conventionally, the electric cylinder device has been actively researched and developed, and many inventions or contrivances relative to the electric cylinder device have already been disclosed.

For example, Patent Literature 1 discloses an invention whose title is "Electric Cylinder" and that relates to a cylinder device for use in, for example, an injection molding apparatus.

The cylinder device disclosed in Patent Literature 1 is composed of a motor disposed in parallel with a screw shaft, a train of gears that transmit a rotational driving force of the motor to the screw shaft, a nut that meshes with the screw shaft, a hollow rod that restrains the rotation of the nut, and an outer cylinder into which the rod is slidably fitted.

According to the thus formed structure, the following operation is performed. When the rotation of the motor is transmitted to the screw shaft by the train of gears, the nut and the rod linearly move, and the rod expands and contracts.

PRIOR ART TECHNICAL DOCUMENTS

Patent Literatures

Patent Literature 1: Japanese Published Unexamined Patent Application No. 2005-86932

SUMMARY OF THE INVENTION

Problems to be Solved by the Invention

However, in the cylinder device disclosed in Patent Literature 1 mentioned above, the driving shaft of the motor and the screw shaft are placed at different positions, respectively, and are placed in parallel with each other, so that the motor, the gear, the hollow rod, the outer cylinder, and the screw shaft are not disposed in the same line, and therefore it has been difficult to improve the feed accuracy of the rod. Additionally, in this cylinder device, the hollow rod is disposed in such a way as to cover the screw shaft, and the outer cylinder is disposed in such a way as to cover the rod, and these many components make the structure complex. In addition to the fact that the runout of the screw shaft increases in proportion to a retreat from the center of rotation of the screw shaft, in this cylinder device, the outer cylinder to which the hollow rod is connected through a key is disposed near the center of rotation of the screw shaft, and the key that serves as a whirl-stop is disposed near the center of rotation of the screw shaft. Therefore, a conventional problem resides in the fact that the runout of the screw shaft is large, and, as a result, the feed accuracy of the rod is low. Another conventional problem resides in the fact that the screw shaft is held only by its end, and therefore, when the rod is fed, runout or looseness is liable to occur, and the feed accuracy of the rod cannot be improved. Still another conventional problem resides in the fact that the entire cylinder device is required to be lengthened in order to increase the length of the feed of the rod, and, as a result, the number of components is increased, thus leading to a great increase in cost.

Normally, in accordance with the intended use, the cylinder device is required to operate in a high speed region, and, on the other hand, is required to have stability in an extremely low speed region. By contrast, in the cylinder device disclosed in Patent Literature 1 mentioned above, the screw shaft is rotated by one motor, and therefore the number of rotations of the motor is required to be changed from 1000 rotations per minute to 10 rotations per minute, for example, when the number of rotations of the screw shaft is changed from 1000 rotations per minute to 10 rotations per minute. However, a great change in the number of rotations of the motor causes a great fluctuation in the output performance, such as a torque value or a current value, and there is a fear that the operational state of the motor will become unstable. In other words, still another conventional problem resides in the fact that, in the cylinder device disclosed in Patent Literature 1, the feed speed of the rod cannot be stably controlled in a wide range from a high speed region to an extremely low speed region.

Means for Solving the Problems

The present invention has been made in consideration of these conventional circumstances, and it is an object of the present invention to provide a cylinder device that is capable of heightening the feed accuracy of a screw shaft by reducing the runout of the rotational center and that is capable of stably controlling the feed speed of a conveying unit in a wide range from a high speed region to an extremely low speed region while suppressing fluctuations in the output of a motor caused by switching between the numbers of rotations.

To achieve the object, a cylinder device in the first aspect of the present invention is characterized by including a hollow shaft motor through which a screw shaft is inserted, a decelerator connected to an output shaft of the hollow shaft motor, a first screw nut that meshes with the screw shaft and that is connected to the decelerator so that a rotational driving force of the hollow shaft motor can be transmitted, and a second screw nut that meshes with the screw shaft and that is disposed to face the first screw nut with the hollow shaft motor placed between the first screw nut and the second screw nut so that a rotational driving force of the hollow shaft motor can be transmitted.

In the thus structured cylinder device, the first screw nut and the second screw nut rotate interrelatedly with each other, and, as a result, the rotational motion of the hollow shaft motor is converted into the linear motion of the screw shaft, i.e., into the feed operation of the screw shaft. Additionally, the screw shaft has its two points that are separated by a predetermined distance and that are held by the first screw nut and the second screw nut, respectively, therefore accomplishing the fact that its rotational center does not easily undergo a runout, and the feed operation and the rotational operation are stabilized. Additionally, the first screw nut and the second screw nut are structured to hold the screw shaft by their entire inner peripheral surfaces, therefore accomplishing the fact that wear-out occurs in a state of being substantially uniformly dispersed.

The second aspect of the present invention is characterized in that the cylinder device according to the first aspect noted above further includes an internal gear connected to the decelerator and an external gear that meshes with the internal gear and that is connected to the first screw nut, in which a rotational driving force of the hollow shaft motor is transmitted to the first screw nut through the external gear and the internal gear.

In the thus structured cylinder device, it is possible to accomplish the fact that a deviation between the internal gear and the external gear with respect to the axial direction and the circumferential direction of the screw shaft is eased by a gap produced in a mesh portion between the internal gear and the external gear.

The third aspect of the present invention is characterized in that the cylinder device according to the first and second aspects noted above further includes a connection shaft that is interposed between the second screw nut and the decelerator and that meshes with an output gear of the decelerator, in which a rotational driving force of the hollow shaft motor is transmitted to the second screw nut through the connection shaft.

In the thus structured cylinder device, it is possible to accomplish the fact that a deviation between the output gear and the connection shaft with respect to the axial direction and the circumferential direction of the screw shaft is eased by a gap produced in a mesh portion between the output gear of the decelerator and the connection shaft.

The fourth aspect of the present invention is characterized in that the cylinder device according to the first to third aspects noted above further includes a motor that is connected to one end of the screw shaft so that a rotational driving force can be transmitted.

In the thus structured cylinder device, it is possible to accomplish the fact that the screw shaft and the first and second screw nuts relatively rotate at a speed corresponding to the rotational direction and the rotational speed of the hollow shaft motor and the motor. At this time, for example, if the first screw nut and the second screw nut are fixed not to move in the axial direction of the screw shaft, the screw shaft proceeds or recedes in the axial direction together with the motor. On the other hand, if the screw shaft is fixed not to move in the axial direction, the first screw nut and the second screw nut proceed or recede in the axial direction of the screw shaft in association with the rotation of the motor.

Effects of the Invention

According to the cylinder device in the first aspect of the present invention, the structure of the device is simple, and therefore an installation space is saved. Additionally, wear-out does not easily occur excessively in the inner peripheral surface of the screw nut holding the screw shaft, and therefore the life of the device can be lengthened. Still additionally, the rotational center of the screw shaft does not easily undergo a runout, and therefore the feed operation and the rotational operation can be stabilized. As a result, the feed accuracy of the screw shaft is heightened. Still additionally, the feed length of the screw shaft can be easily changed by changing the length of the screw shaft. Still additionally, when the diameter of the screw shaft is changed, this change can be carried out merely by changing the diameter of the first screw nut and the diameter of the second screw nut. In other words, unlike a conventional cylinder device, there is no need to change the size of the entire device, such as the screw shaft, the outer cylinder, and the casing, when the feed length or the diameter of the screw shaft is changed. Therefore, mass productivity can be heightened, for example, by modularizing the device body.

According to the cylinder device in the second and third aspects of the present invention, an assembly error, a processing error peculiar to a component, or a mechanical error resulting from, for example, thermal deformation is eased, and therefore the assembly accuracy of the device can be heightened.

According to the cylinder device in the fourth aspect of the present invention, the first screw nut and the second screw nut or the feed speed of the screw shaft can be stably controlled in a wide range from a high speed region to an extremely low speed region by adjusting the number of rotations of the hollow shaft motor and the number of rotations of the motor connected to one end of the screw shaft. Additionally, fluctuations in the output performance of these two motors can be made as small as possible.

DESCRIPTION OF REFERENCE NUMERALS

Figure 1:
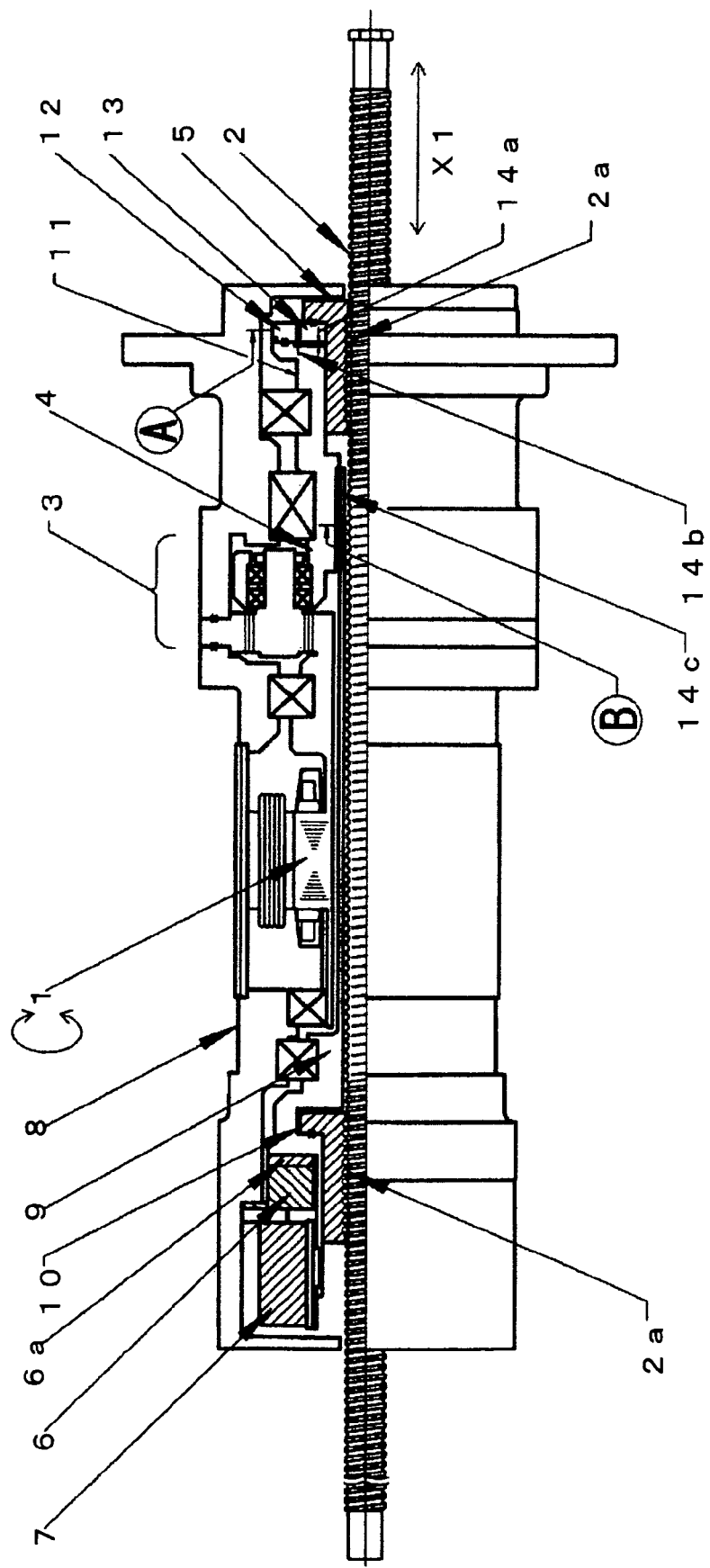
FIG. 1 is a sectional view of Example 1 of the cylinder device according to a first embodiment of the present invention.

1 . . . Hollow shaft motor
2 . . . Ball screw shaft (ball screw rod)
2a . . . Ball
3 . . . Decelerator
4 . . . Carrier
5 . . . Ball screw nut
6 . . . Brake
6a . . . Rotary table 7 . . . Encoder
8 . . . Housing
9 . . . Connection shaft
10 . . . Ball screw nut
11 . . . Spacer
12 . . . Internal gear
13 . . . External gear
14a . . . Gap
14b . . . Gap
14c . . . Gap
15 . . . Base
16 . . . Slide guide
17 . . . Motor
18 . . . Coupling
19 . . . Slide plate
20 . . . Support pillar
21 . . . Support arm
22a . . . Bearing
22b . . . Bearing
23 . . . Workpiece
24 . . . Slide base
25 . . . Guide shaft
26 . . . Support pillar

MODES FOR CARRYING OUT THE INVENTION (First Embodiment)

A cylinder device according to a first embodiment of the present invention will be hereinafter described in detail with reference to FIG. 1 to FIG. 4.

Figure 2:
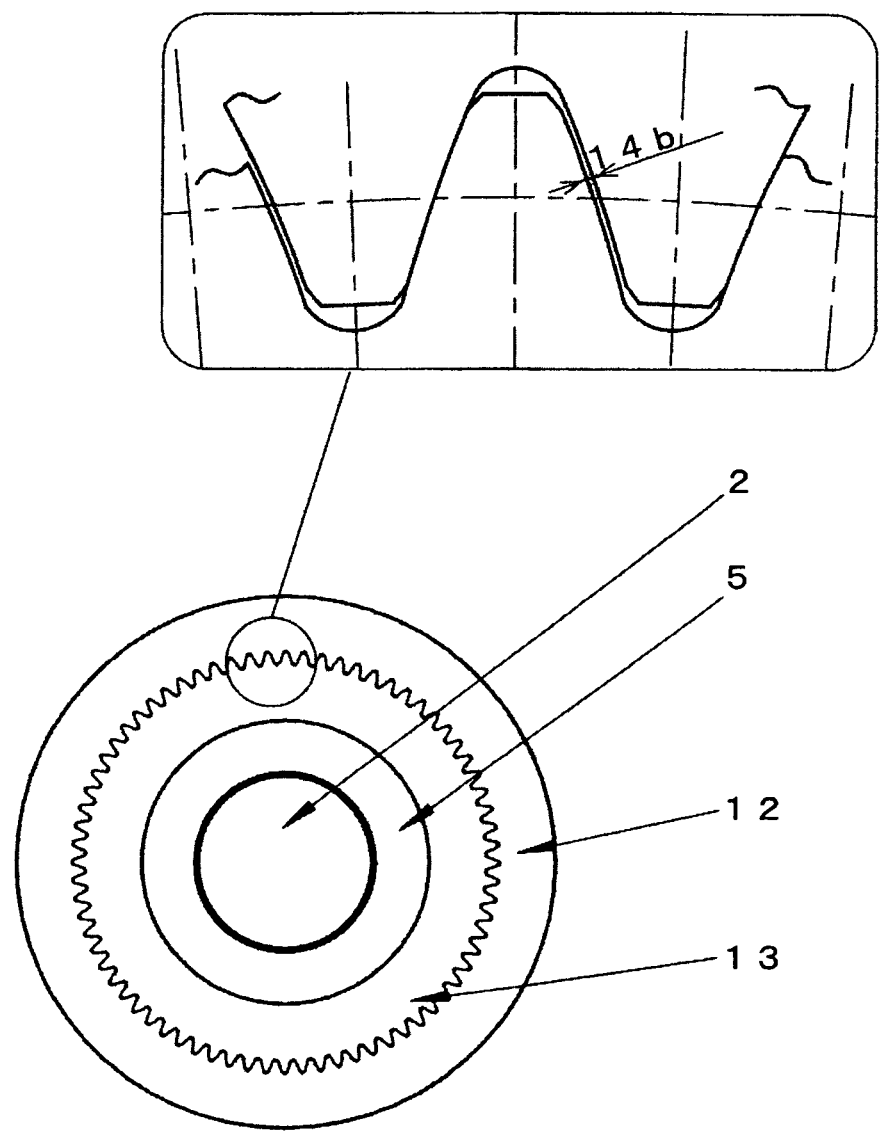
FIG. 2 is an enlarged view of a cross section of part A of FIG. 1.
Figure 3:
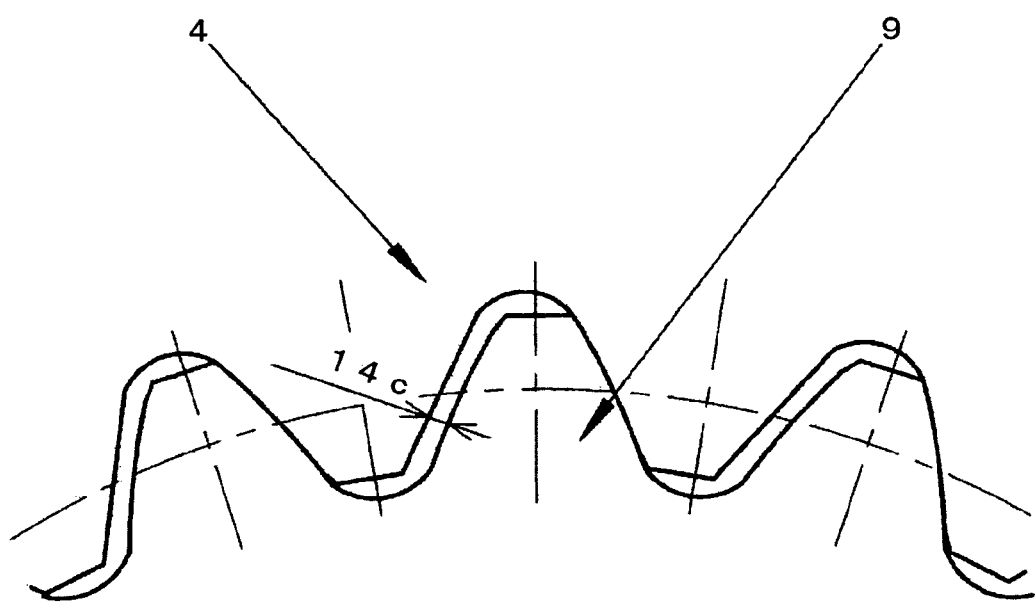
FIG. 3 is an enlarged view of a mesh portion at which a carrier and a connection shaft mesh with each other in a cross section of part B of FIG. 1.
Figure 4:
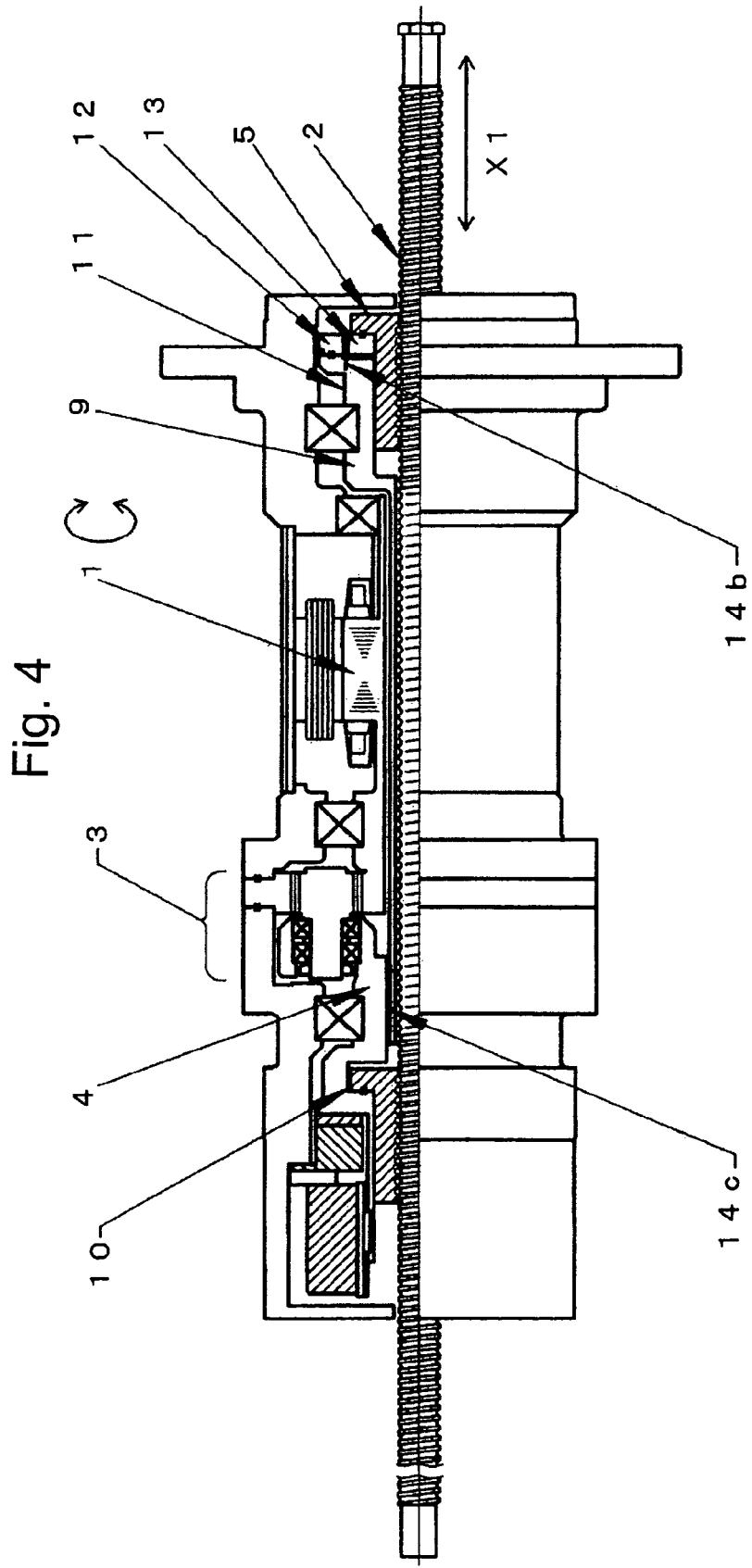
FIG. 4 is a sectional view of Example 2 of the cylinder device according to the first embodiment of the present invention.

FIG. 1 is a sectional view of Example 1 of the cylinder device according to the first embodiment of the present invention. FIG. 2 is an enlarged view of a cross section of part A of FIG. 1. FIG. 3 is an enlarged view of a mesh portion at which a carrier 4 and a connection shaft 9 mesh with each other in a cross section of part B of FIG. 1. FIG. 4 is a sectional view of Example 2 of the cylinder device according to the first embodiment of the present invention. FIG. 1 and FIG. 4 show a state of being cut by a plane including the rotational center of a ball screw shaft 2, whereas FIG. 2 and FIG. 3 show a state of being cut by a plane perpendicular to the rotational center of the ball screw shaft 2. In FIG. 1 to FIG. 4, hatching that designates a cross section is not shown, except for a brake 6, an encoder 7, and ball screw nuts 5 and 10. In the following description, for descriptive convenience, the axial direction of the ball screw shaft 2 (i.e., direction shown by arrow X1 in the figures) is referred to as a front-back direction.

As shown in FIG. 1, in the cylinder device of Example 1, a planetary reduction gear unit (hereinafter, referred to simply as a "decelerator" 3) is connected to the hollow shaft motor 1 through which the ball screw shaft (ball screw rod) 2 is inserted, and each of a pair of ball screw nuts 5 and 10, which are disposed to face each other and between which the hollow shaft motor 1 and the decelerator 3 are placed, meshes with the ball screw shaft 2. An internal gear 12 is connected to a spacer 11 disposed at an end of an output gear (i.e., carrier 4) of the decelerator 3, and an external gear 13 connected to the ball screw nut 5 meshes with the internal gear 12. At this time, a gap 14b produced at a mesh portion at which the internal gear 12 and the external gear 13 shown in FIG. 2 mesh with each other functions as a buffer for a deviation between the internal gear 12 and the external gear with respect to the axial direction and the circumferential direction of the ball screw shaft 2.

The hollow shaft motor 1 is built in a housing 8, and another end of the hollow shaft motor 1 to which the decelerator 3 is not connected is fixed to the housing 8. Likewise, the brake 6 and the encoder 7 are built in the housing 8, and the rotary table 6a of the brake 6 is connected to the ball screw nut 10 through the connection shaft 9. The output gear (carrier 4) of the decelerator 3 meshes with the connection shaft 9 by splines. A gap 14c (see FIG. 3) produced at a mesh portion at which the carrier 4 and the connection shaft 9 mesh with each other functions as a buffer for a deviation between the carrier 4 and the connection shaft 9 with respect to the axial direction and the circumferential direction of the ball screw shaft 2.

The external gear 13 is attached to the ball screw nut 5, and then the ball screw nut 5 is attached to the ball screw shaft 2 in a state in which a planar part of the external gear 13 is in contact with an end surface of the spacer 11. Thereafter, the position of the ball screw nut 5 is finely adjusted with respect to the ball screw shaft 2 so that a predetermined gap 14a is produced between the end surface of the spacer 11 and the planar part of the external gear 13. Finally, the internal gear 12 is disposed so as to mesh with the external gear 13. When the ball screw nuts 5 and 10 are positionally adjusted with respect to the ball screw shaft 2, the gap 14a functions as a buffer for a positional deviation of the ball screw nuts 5 and 10 with respect to the axial direction of the ball screw shaft 2.

In the thus structured cylinder device, when the hollow shaft motor 1 is rotated, the decelerator 3 rotates, and, in association with this rotation, the ball screw nut 5 connected to the decelerator 3 rotates through the internal gear 12 and the external gear 13. Furthermore, the ball screw nut 10 connected to the decelerator 3 through the connection shaft 9 rotates in association with the ball screw nut 5. Furthermore, a ball 2a between the ball screw shaft 2 and the ball screw nuts 5 and 10 rolls, and the rotational motion of the hollow shaft motor 1 is converted into the linear motion of a feed operation of the ball screw shaft 2 as shown by arrow X1. The ball screw shaft 2 has its two points that are separated by a predetermined distance and that are held by the ball screw nuts 5 and 10, respectively, and therefore its rotational center does not easily undergo a runout. Additionally, the ball screw nuts 5 and 10 are structured to hold the ball screw shaft 2 by the entire inner peripheral surfaces thereof, and therefore, as an effect, wear-out occurs in a state of being substantially uniformly dispersed.

As described above, the cylinder device of this example has a structure in which the hollow shaft motor 1 and the decelerator 3 are combined together, and therefore the driving force, the speed, or the feed accuracy for feeding the ball screw shaft 2 can be adjusted to meet the purpose of use. As a result, the working efficiency of the device is heightened. Additionally, each component is disposed in parallel with the ball screw shaft 2, and therefore the assembly accuracy of the device is heightened. Still additionally, the structure of the device is simple, and therefore an installation space can be saved. Still additionally, the rotational center of the ball screw shaft 2 does not easily undergo a runout, and therefore the feed operation and the rotational operation can be stabilized. As a result, the feed accuracy of the ball screw shaft 2 is heightened. Still additionally, an assembly error, a processing error peculiar to a component, or a mechanical error resulting from, for example, thermal deformation is eased by the carrier 4, the connection shaft 9, and the mesh portion between the internal gear 12 and the external gear 13, and therefore the assembly accuracy of the device can be heightened. Still additionally, in the cylinder device of the present invention, the ball screw shaft 2 is slidably inserted into a hollow part between the hollow shaft motor 1 and the decelerator 3, and the cylinder device of the present invention is higher in the positioning accuracy of the ball screw shaft 2 than a conventional cylinder device in which a screw shaft is disposed so as to penetrate through a solid motor and a decelerator, because the cylinder device of the present invention is not easily affected by, for example, vibrations from the motor and the decelerator during operation.

Still additionally, wear-out does not easily occur excessively in the inner peripheral surfaces of the ball screw nuts 5 and 10 holding the ball screw shaft 2, and therefore the life of the device can be lengthened. Still additionally, when the feed length of the ball screw shaft 2 is changed, what is required is merely to change the length of the ball screw shaft 2. Still additionally, likewise, when the diameter of the ball screw shaft 2 is changed, what is required is merely to change the diameters of the ball screw nuts 5 and 10. In other words, unlike a conventional cylinder device, there is no need to change the size of the entire device, such as the screw shaft, the outer cylinder, or the casing, even when the feed length or the diameter of the ball screw shaft 2 is changed. Therefore, mass productivity can be heightened, for example, by modularizing the device body.

As shown in FIG. 4, the cylinder device of Example 2 is structured such that the disposition of the hollow shaft motor 1 and the disposition of the decelerator 3 are replaced by each other in the cylinder device of Example 1, and the ball screw nut 10 is connected to the output gear (carrier 4) of the decelerator 3. Additionally, the cylinder device of Example 2 is characterized in that the decelerator 3 and the ball screw nut 5 are connected together by engaging the carrier 4 and the connection shaft 9 with each other by splines and by connecting the ball screw nut 5 and the connection shaft 9 together by engagement between the internal gear 12 and the external gear 13 so that the ball screw nut 10 and the ball screw nut 5 operate interrelatedly with each other.

In the thus structured cylinder device, the ball screw nuts 5 and 10 are interrelatedly rotated in association with the rotational motion of the hollow shaft motor 1. As a result, the ball screw shaft 2 moves as shown by arrow X1.

(Second Embodiment)

A cylinder device according to a second embodiment of the present invention will be described in detail with reference to FIG. 5 to FIG. 7.

Figure 5:
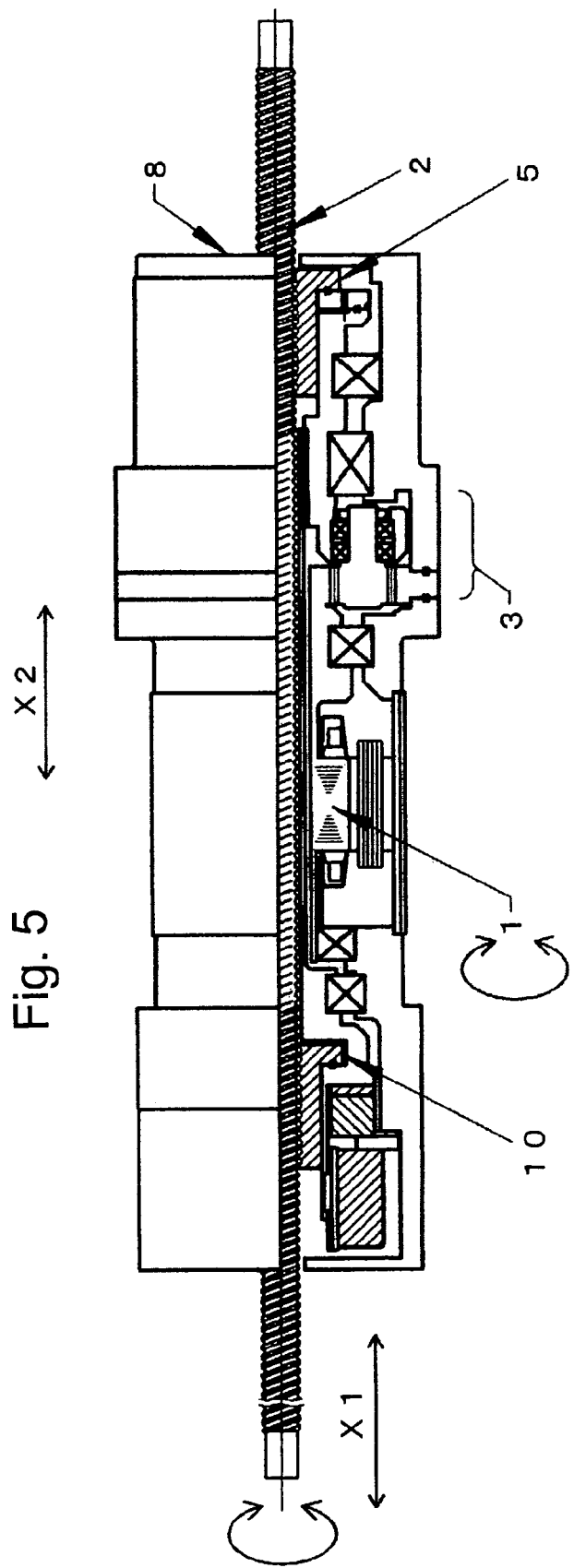
FIG. 5 is a sectional view of a cylinder device according to a second embodiment of the present invention.
Figure 6:
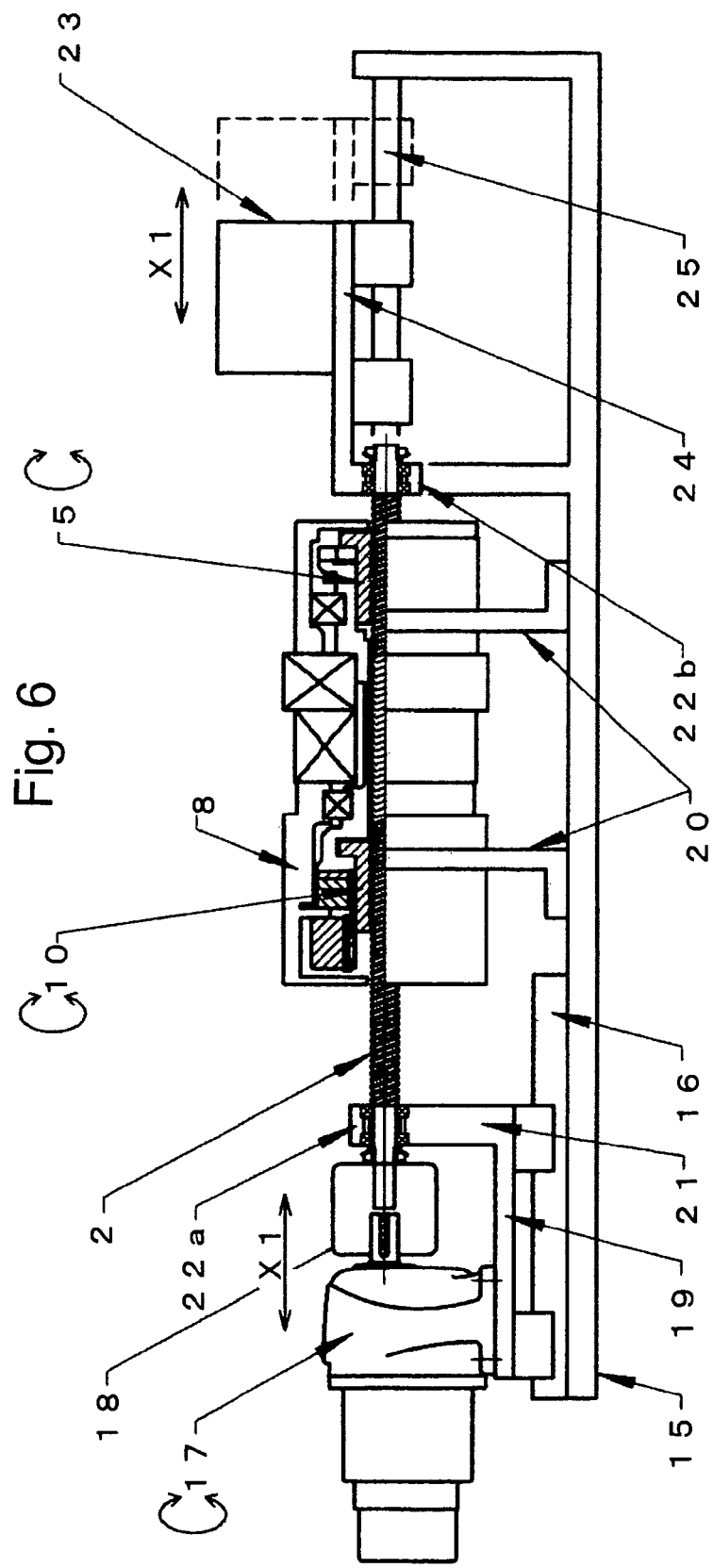
FIG. 6 is a sectional view of Example 1 of the cylinder device according to the second embodiment of the present invention.
Figure 7:
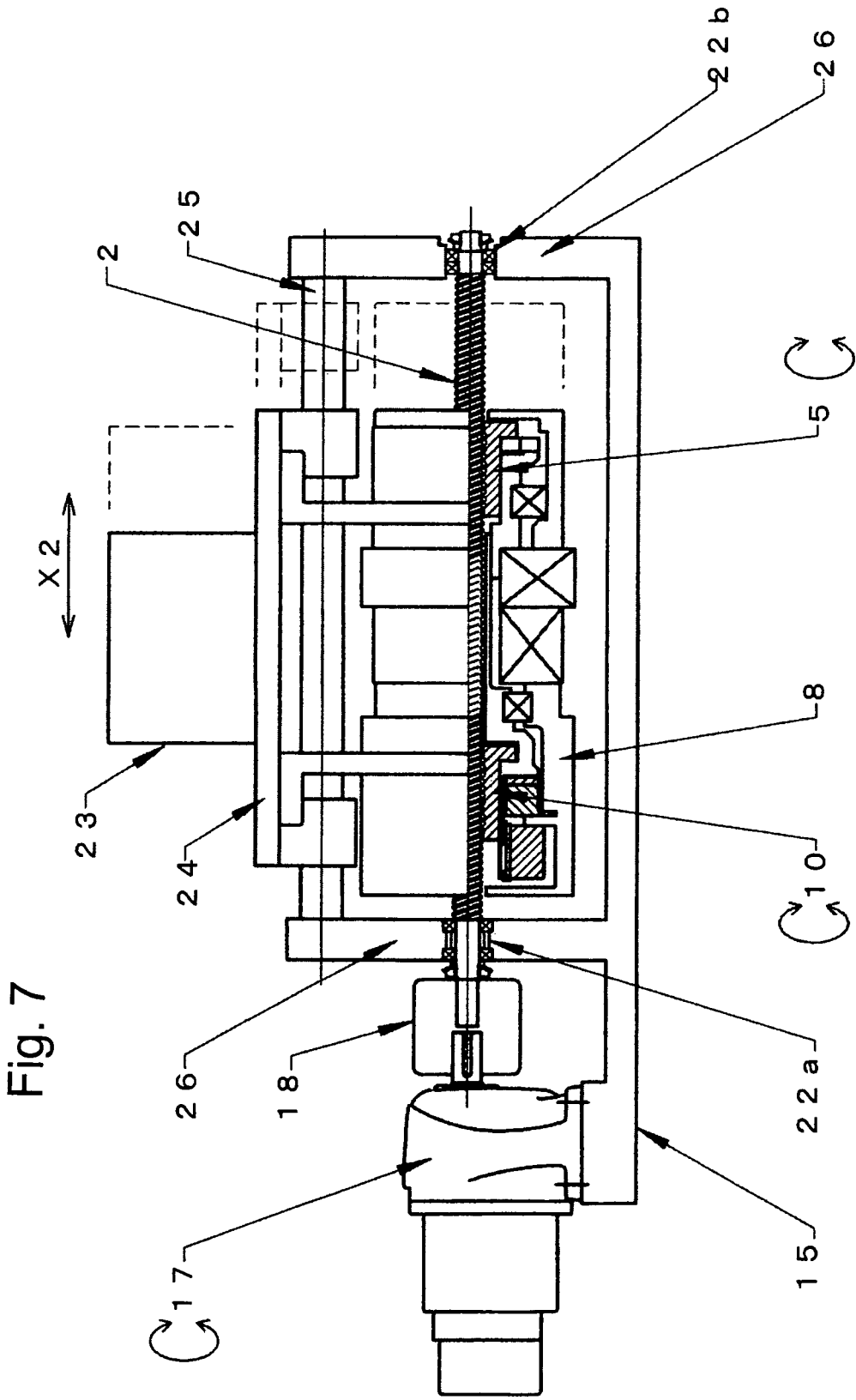
FIG. 7 is a sectional view of Example 2 of the cylinder device according to the second embodiment of the present invention.

FIG. 5 is a sectional view of the cylinder device according to the second embodiment of the present invention, and FIG. 6 and FIG. 7 are sectional views of Example 1 and Example 2, respectively, of the cylinder device according to the second embodiment of the present invention. FIG. 5 to FIG. 7 show a state of being cut by a plane including the rotational center of the ball screw shaft 2. The same reference numeral is given to each of the components shown in FIG. 1 to FIG. 4, and a description of these components is omitted.

In the cylinder device of Example 1 of the first embodiment (see FIG. 1), a motor that differs from the hollow shaft motor 1 may be disposed at one end of the ball screw shaft 2, and the ball screw shaft 2 may be rotated by these two motors. In this case, the ball screw nuts 5 and 10 and the ball screw shaft 2 are relatively rotated at a speed corresponding to the rotational direction and the rotational speed of the two motors. For example, when the ball screw shaft 2 is rotated in a state in which the housing 8 is fixed not to move in the front-back direction, the ball screw shaft 2 moves in the front-back direction as shown by arrow X1 in FIG. 5. When the ball screw shaft 2 is fixed not to move in the front-back direction, the housing 8 moves in the front-back direction in association with the rotation of the ball screw shaft 2 as shown by arrow X2 in FIG. 5.

A case in which the housing 8 is fixed (Example 1) and a case in which the ball screw shaft 2 is fixed (Example 2) will be hereinafter described with reference to FIG. 6 and FIG. 7, respectively.

As shown in FIG. 6, the cylinder device of Example 1 has a structure in which a slide guide 16 is laid on the upper surface of a base 15, and a motor 17 is connected to one end of the ball screw shaft 2 through a coupling 18, and is disposed slidably on the slide guide 16 with a slide plate 19 placed therebetween. The housing 8 including the built-in hollow shaft motor 1 (not shown) is fixed to the base 15 by a pair of support pillars 20 and 20, and the end of the ball screw shaft 2 to which the coupling 18 is connected is supported by a bearing 22*a* provided on a support arm 21 erected on the slide plate 19. A slide base 24 having its upper surface on which a workpiece 23 is placed is connected to the other end of the ball screw shaft 2 through a bearing 22*b*. The slide base 24 can move along the guide shaft 25 as shown by arrow X1.

In the thus structured cylinder device, when the hollow shaft motor 1 and the motor 17 are rotated, the ball screw nuts 5 and 10 rotate interrelatedly with these rotations, and, accordingly, the ball screw shaft 2 also rotates. The slide base 24 connected to the end of the ball screw shaft 2 moves along the guide shaft 25 as shown by arrow X1, and the motor 17 connected to the other end of the ball screw shaft 2 slides on the base 15 along the slide guide 16 together with the slide plate 19 in association with a movement of the ball screw shaft 2. Therefore, according to the cylinder device of this example, a distance between the motor 17 and the slide base 24 can be lengthened.

The ball screw shaft 2 moves even when only one of the hollow shaft motor 1 and the motor 17 is rotated. Especially when the hollow shaft motor 1 and the motor 17 are rotated at mutually different numbers of rotations in mutually opposite directions, the ball screw shaft 2 and the slide base 24 connected to this shaft move in the front-back direction at a speed corresponding to a difference in the number of rotations between the motors. In the conventional cylinder device disclosed in Patent Literature 1 mentioned above, it is impossible to change the number of rotations of the ball screw shaft 2, for example, from 1000 rotations per minute to 1 rotation per minute. By contrast, in the cylinder device of this example, when the hollow shaft motor 1 and the motor 17 are rotated, for example, at a speed of 1000 rotations per minute and at a speed of 1001 rotations per minute in mutually opposite directions, respectively, the ball screw shaft 2 rotates at a speed of 1 rotation per minute. In other words, the slide base 24 can be fed at a desired speed by adjusting the number of rotations of the hollow shaft motor 1 and the number of rotations of the motor 17. Accordingly, in the cylinder device of this example, the feed speed of the slide base 24 can be stably controlled in a wide range from a high speed region to an extremely low speed region. In this case, the hollow shaft motor 1 and the motor are not required to greatly change the number of rotations, and therefore output performance does not easily fluctuate.

As shown in FIG. 7, the cylinder device of Example 2 is characterized in that, in the cylinder device of Example 1 according to this embodiment, the motor 17 fixed to the base 15 is connected to one end of the ball screw shaft 2 through the coupling 18, and the slide base 24 having its upper surface on which the workpiece 23 is placed is fixed to the housing 8 including the built-in hollow shaft motor 1 (not shown). Both ends of the ball screw shaft 2 are supported by the bearings 22*a* and 22*b* respectively provided on a pair of support pillars 26 and 26 erected on the base 15, and the slide base 24 is disposed slidably along the guide shaft 25 both ends of which are supported by the support pillars 26 and 26, respectively, as shown by arrow X2.

In the thus structured cylinder device, the ball screw nuts 5 and 10 are interrelatedly rotated by the rotation of the hollow shaft motor 1 and the rotation of the motor 17. Accordingly, the ball screw shaft 2 rotates, and the slide base 24 fixed to the housing 8 slides along the guide shaft 25 as shown by arrow X2. In other words, in the cylinder device of this example, both ends of the ball screw shaft 2 are supported by the bearings 22a and 22b, respectively, and therefore the rotational center of the ball screw shaft 2 does not easily undergo a runout when the hollow shaft motor 1 and the motor 17 are working. Therefore, the feed accuracy of the slide base 24 can be heightened.

When the hollow shaft motor 1 and the motor 17 are rotated at mutually different numbers of rotations in mutually opposite directions, the slide base 24 moves at a speed corresponding to a difference in the number of rotations between the motors. In other words, as in the cylinder device of Example 2, in the cylinder device of this example, the feed speed of the slide base 24 can be changed by adjusting the number of rotations of the hollow shaft motor 1 and the number of rotations of the motor 17. Accordingly, the feed speed of the slide base 24 can be stably controlled in a wide range from a high speed region to an extremely low speed region. Additionally, as in Example 2, fluctuations in the output performance of the hollow shaft motor 1 and fluctuations in the output performance of the motor 17 can be made as small as possible.

The cylinder device of the present invention is not limited to the one shown in each example of the first and second embodiments, and can be appropriately modified. In detail, besides a planetary reduction gear unit, a variety of differential reduction gear units, such as a reduction gear pair with parallel axes or a reduction gear pair with orthogonal axes, can be used as the decelerator 3. Additionally, a structure may be formed in which gears other than the internal and external gears 12 and 13 are interposed between the decelerator 3 and the ball screw nut 5, so that the rotational driving force of the hollow shaft motor 1 is transmitted to the ball screw nut 5 through these gears. Additionally, the carrier 4 and the connection shaft 9 may be engaged with each other according to a method that does not use splines. Additionally, a trapezoidal screw thread or a square screw thread may be used as the ball screw shaft 2. If a high feed accuracy is required as in a driving unit for an XY table of, for example, a measuring instrument, a ball screw shaft and a ball screw nut may be used, and, if a relatively high feed accuracy is not required as in an apparatus for conveying baggage, a mere screw shaft or a mere screw nut may be used instead of the ball screw shaft or the ball screw nut. The above-mentioned operation and effect are likewise fulfilled even if the ball screw shaft and the ball screw nut are replaced with a screw shaft and a screw nut in each example mentioned above. Additionally, instead of a structure in which the workpiece 23 is placed on the upper surface of the slide base 24, the slide base 24 may be connected to a movable component of another piece of equipment, and the cylinder device of the present invention may be used as a driving unit for this equipment.

Industrial Applicability

The invention defined in the appended claims is applicable to an injection molding machine, a die casting machine, an apparatus for conveying articles, or a driving unit for an XY table.

The invention claimed is:

1. A cylinder device comprising:
   a hollow shaft motor through which a screw shaft is inserted;
   a decelerator connected to an output shaft of the hollow shaft motor;
   a first screw nut that meshes with the screw shaft and that is connected to the decelerator so that a rotational driving force of the hollow shaft motor can be transmitted;
   a second screw nut that meshes with the screw shaft and that is disposed to face the first screw nut with the hollow shaft motor placed between the first screw nut and the second screw nut so that a rotational driving force of the hollow shaft motor can be transmitted;
   an internal gear connected to the decelerator; and
   an external gear that meshes with the internal gear and that is connected to the first screw nut,
   wherein a rotational driving force of the hollow shaft motor is transmitted to the first screw nut through the external gear and the internal gear.

2. The cylinder device of claim 1, further comprising a motor that is connected to one end of the screw shaft so that a rotational driving force can be transmitted.

3. A cylinder device comprising:
   a hollow shaft motor through which a screw shaft is inserted;
   a decelerator connected to an output shaft of the hollow shaft motor;
   a first screw nut that meshes with the screw shaft and that is connected to the decelerator so that a rotational driving force of the hollow shaft motor can be transmitted;
   a second screw nut that meshes with the screw shaft and that is disposed to face the first screw nut with the hollow shaft motor placed between the first screw nut and the second screw nut so that a rotational driving force of the hollow shaft motor can be transmitted; and
   a connection shaft that is interposed between either first screw nut or the second screw nut and the decelerator and that meshes with an output gear of the decelerator,
   wherein a rotational driving force of the hollow shaft motor is transmitted to either first screw nut or the second screw nut through the connection shaft.

4. The cylinder device of claim 3, further comprising a motor that is connected to one end of the screw shaft so that a rotational driving force can be transmitted.

* * * * *